United States Patent
Ogura et al.

[11] 3,973,832
[45] Aug. 10, 1976

[54] RETRO-FOCUS TYPE WIDE ANGLE LENS SYSTEM

[75] Inventors: Toshinobu Ogura, Tondabayashi; Akiyoshi Nakamura, Sakai, both of Japan

[73] Assignee: Minolta Camera Kabushiki Kaisha, Osaka, Japan

[22] Filed: Jan. 25, 1974

[21] Appl. No.: 436,763

[30] Foreign Application Priority Data
Jan. 30, 1973 Japan.................. 48-11571

[52] U.S. Cl................... 350/214; 350/215
[51] Int. Cl.².................. G02B 9/62; G02B 9/64
[58] Field of Search.................. 350/214, 215

[56] References Cited
UNITED STATES PATENTS

| | | | |
|---|---|---|---|
| 3,583,791 | 6/1971 | Mori | 350/214 |
| 3,635,546 | 1/1972 | Mori | 350/214 |
| 3,740,120 | 6/1973 | Ruhl | 350/214 |
| 3,862,794 | 1/1975 | Fuji | 350/214 |

*Primary Examiner*—John K. Corbin
*Assistant Examiner*—Conrad Clark
*Attorney, Agent, or Firm*—Wolder & Gross

[57] ABSTRACT

A retro-focus type wide angle lens system comprises a negative first component located on the object side and including at least one negative meniscus lens; a positive intermediate second component consisting of one or two lens groups including at least one biconvex lens group and a rear third component which includes of four consecutive lenses including, in order, a positive meniscus first lens having a rear convex surface, a biconcave second lens, a positive meniscus third lens having a rear convex surface and a fourth positive lens; whereby the back focus of the total lens system is longer than the focal length, and satisfying the following conditions:

(1) $d_{c0} > d_{c2}$ (2) $|r_{c2}| \geq |r_{c3}|$ (3) $V_{c1} > V_{c2}$ (4) $d_{c0} > d_{c4}$ wherein
$r_{c2}$ and $r_{c3}$ are the radius of curvature of the rear surface of the first lens of the third component and the radius of curvature of the front surface of the second lens of the third component, respectively; $d_{c0}$ is the axial distance between the rear lens of the second component and the first lens of the third component; $d_{c2}$ and $d_{c4}$ are the axial distance between the first and second lenses of the third component and the axial distance between the second lens and the third lens; and
$V_{c1}$ and $V_{c2}$ are Abbe's Numbers of the first and second lenses of the third component.

6 Claims, 12 Drawing Figures

RETRO-FOCUS TYPE WIDE ANGLE LENS SYSTEM

BACKGROUND OF THE INVENTION

This invention relates to a wide angle lens of a retro-focus type, and more particularly to an objective lens adapted for use in a single lens reflex camera and having a back focus of a length greater than the focal length thereof.

Hitherto, the conventional type wide angle lens of this kind suffers from shortcomings in that the wider the angle of field, the more difficult will be the compensation of the various abberations, such that it is extremely difficult to provide a wide angle lens which has a large relative aperture of high brightness.

It is a principal object of the invention to provide a wide angle lens system of the retro-focus type for use in a photographic camera, said system having a field angle of 64° to 76°, a relative aperture of F/2.8 to F/2 and a back focus of a length of 1.06 to 1.32 times as long as the focal length, yet being highly compensated for the various abberations.

SUMMARY OF THE INVENTION

According to the present invention, there is provided a lens system of the retro-focus type, comprising: a first component which is located on the object side, has a negative refractive power and includes at least one negative meniscus lens; a second component which has a positive refractive power, consists of one or two lens groups including at least one biconvex lens group and is placed next to said first component; and a third component which consists of four lenses and is placed next to said second component, said four lenses consisting, in the order appearing from the object side of a positive meniscus first lens having the convex surface facing the image side, a biconcave second lens, a positive meniscus third lens having the convex surface facing the image side and a fourth positive lens; whereby the back focus of the total lens system is rendered longer than the focal length, while satisfying the following conditions:

(1) $d_{c0} > d_{c2}$ (2) $|r_{c2}| \geqq |r_{c3}|$ (3) $V_{c1} > V_{c2}$ (4) $d_{c0} > d_{c4}$ wherein $r_{c2}$ and $r_{c3}$ are radius of curvature of the curved surface, on the image side, of the first lens of the third component and radius of curvature of the curved surface, on the object side, of the second lens of the third component, respectively;

$d_{c0}$ is an axial distance between the lens of the second component on the side nearest to the image and the first lens of the third component;

$d_{c2}$ and $d_{c4}$ are an axial distance between the first and second lenses of the third component and an axial distance between the second lens and the third lens; and $V_{c1}$ and $V_{c2}$ are Abbe's Numbers of the first and second lenses of the third component.

DETAILED DESCRIPTION OF THE INVENTION

Figure 1:
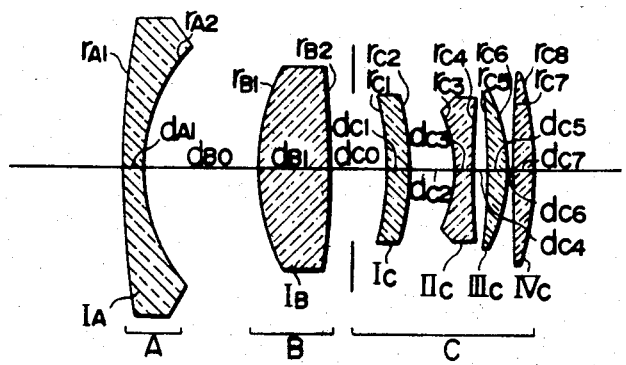
FIG. 1 is a diagram showing the construction of a first embodiment of the invention.
Figure 2:
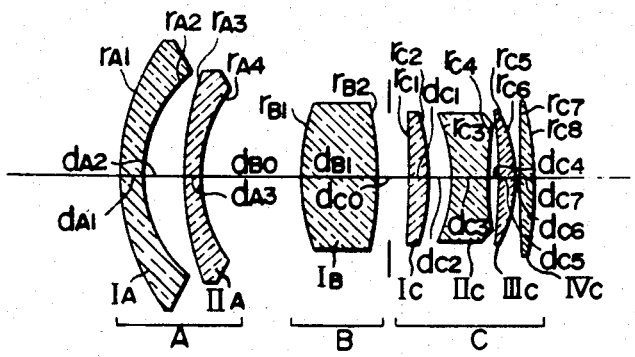
FIG. 2 is a diagram showing the construction of a second embodiment of the invention.
Figure 3:
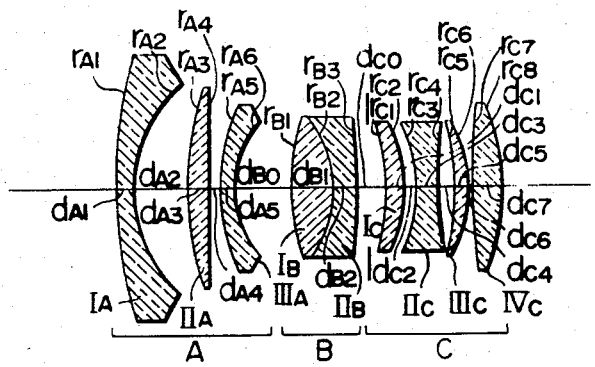
FIG. 3 is a diagram showing the construction of a third embodiment of the invention.
Figure 4:
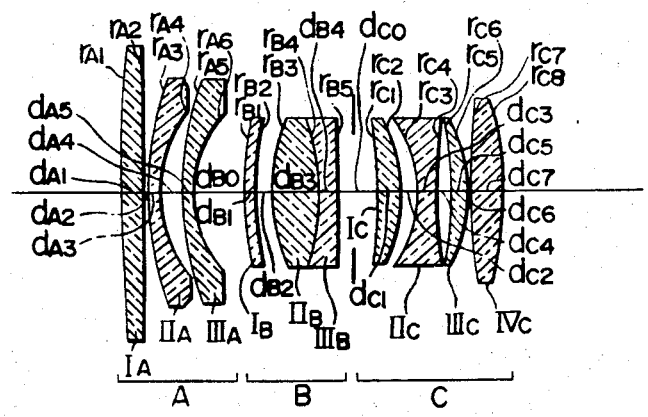
FIG. 4 is a diagram showing the construction of a fourth embodiment of the invention.
Figure 5:
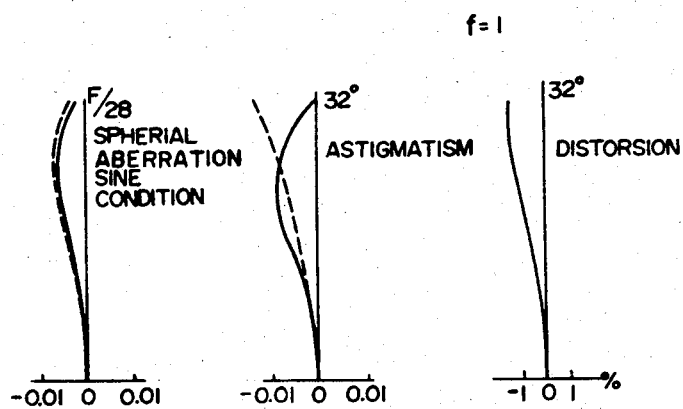
FIG. 5 to 8 are plots illustrating spherical aberrations, sine conditions, astigmatisms and distortions of the first to fourth embodiments, respectively.
Figure 6:
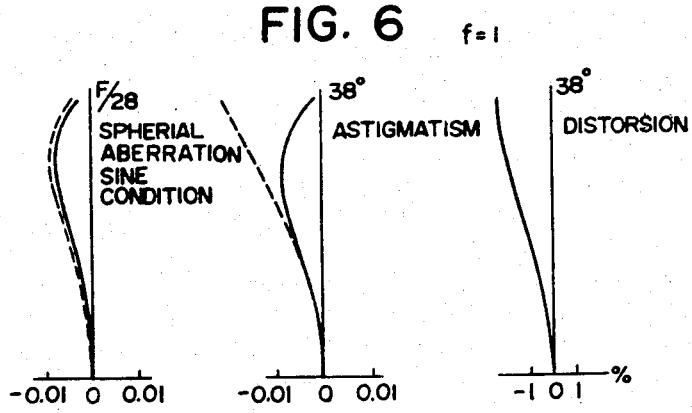
Figure 7:
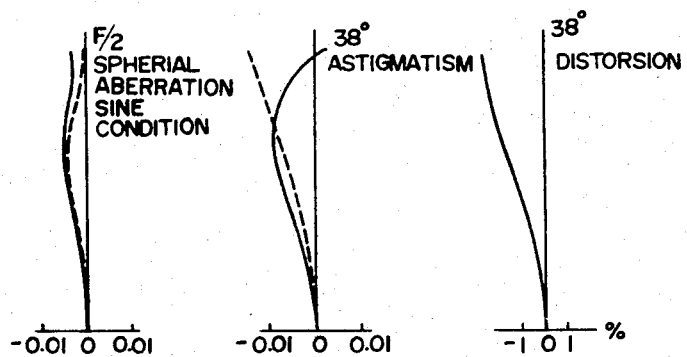
Figure 8:
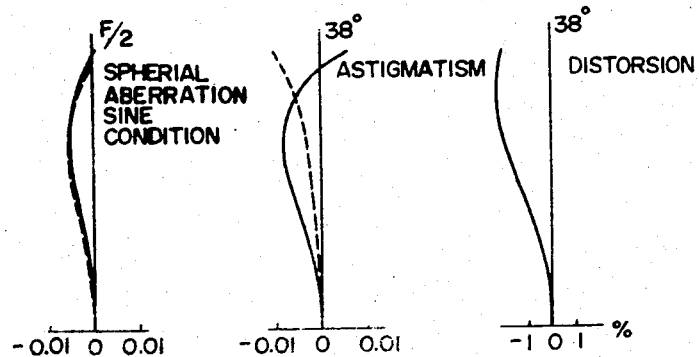
Figure 9:
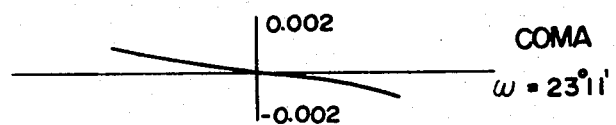
FIGS. 9 to 12 are coma of respective embodiments of the invention.
Figure 10:
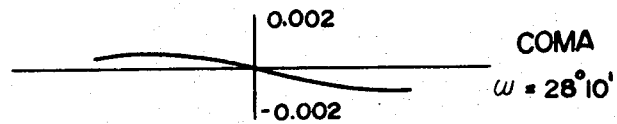
Figure 11:
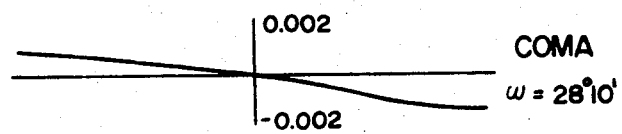
Figure 12:
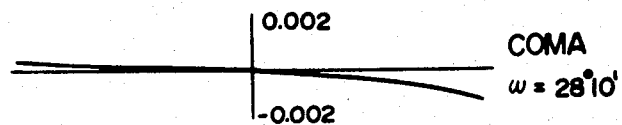

According to the present invention, an objective lens system of a retro-focus type is divided into three components, i.e., a first to third component which are so referred to in the order from the object side or front to the image side or rear and in which, for achieving a back focus of a length greater than the focal distance, the first component A includes at least one negative meniscus lens, thereby presenting an improved diverging lens system. The lens system of the kind described includes one negative meniscus lens such as lens 1A in the first embodiment. However, if it is difficult to compensate the aberration created by the first component A by using the second component and above, the negative refractive power may be shared by the two negative lenses IA and II A as shown in the second embodiment, or one positive lens IIA (the third embodiment) or IA (the fourth embodiment) may be added to two negative lenses as shown in FIGS. 3 and 4, thereby reducing the aberration caused in the first component, while facilitating compensation of the aberrations created in the second component and after. However, in either case, it cannot be avoided that the distortion or coma is transmitted to the second component and after, without being compensated, when providing an improved diverging capability to the first component A.

For off-setting the aberration created in the aforesaid first component, there should be provided a second component B having a positive refractive power and consisting of one lens group including at least one biconvex lens group (The first, second and third embodiments) or two lens groups (fourth embodiment), whereby there is provided therein an aberration having an opposite sign to that of the aforesaid aberration created in the first component A for compensating same, after which the residual aberration therefrom will be finally compensated by the third component C, thereby obtaining a lens system having a wide angle, a large relative aperture and well compensated aberration.

The third component consists of four lenses, of which the first lens IC and the second lens IIC form a diverging lens group as a whole. In this respect, if the diverging lens group consists of a single lens IIC alone, a large coma aberration will result, whereby difficulties are encountered with the compensation of the chromatic aberration.

To cope with this, it may be considered to form the aforesaid diverging lens group by using the first positive lens, to which is adhered the second negative lens. This method enables the compensation of the chromatic aberration, but the coma remains uncompensated. According to the present invention, the first lens IC is spaced apart from the second lens IIC, with an air space being provided therebetween, and the air lens thus formed between the both lenses is deliberately utilized to eliminate the coma.

According to the present invention, the following relationship is established between the axial distance $d_{c0}$ between the lens of the second component B, which is nearest to the image and the first lens of the third component C, and the axial distance $d_{c2}$ between the first lens of the third component and the second lens IIC:

$$d_{c0} > d_{c2}$$

It should be noted that the above relationship, i.e., the first condition of the invention specifies the position of the first lens IC with respect to the positions of the second component B and third component C. If the aforesaid condition is not met, the coma compensation by means of the second lens IIC is difficult, while there is created a negative deviation in the astigmatism, thus resulting in shorter back focus.

According to a second condition of the system of the present invention, the following relationship is established between the radius of curvature $r_{c2}$ of the rear surface of the first lens of the third component and the radius of curvature $r_{c3}$ of the front surface of second lens IIC:

$$|r_{c3}| \geq |r_{c2}|$$

The above second condition features the aforesaid air lens and enables the effective function thereof. Unless this condition is met, difficulties will be encountered in copensating coma, while the spherical aberration will result in a deviated position to the negative side.

According to a third condition of the invention, the following relationship is established between the Abbe's Number $V_{c1}$ of the first lens IC of the third component and the Abbe's Number $V_{c2}$ of the second lens IIC:

$$V_{c1} > V_{c2}$$

The above third condition provides for effective compensation of the longitudinal chromatic aberration and lateral chromatic aberration by means of the first lens IC and second lens IIC. If there is used an Abbe's Number which fails to meet this condition, then there will be lost the degree of freedom in selecting the Abbe's Number for the first and second components, such that it becomes difficult to compensate the longitudinal and lateral chromatic aberrations at the same time.

According to a fourth condition of the invention, the following condition is established between the aforesaid axial distance $d_{c0}$ and the axial distance $d_{c4}$ which is between the second lens IIC and the third lens IIIC of the third component C:

$$d_{c0} > d_{c4}$$

The fourth condition specifies the axial distance $d_{c4}$. If the aforesaid condition is not met, then there will be increased negative distortion, while the coma will be negative, such that it becomes impossible to compensate coma throughout the entire field angles of the lens system.

Description will now be given of the first to fourth embodiments according to the present invention.

The first embodiment is a lens system consisting of six groups, i. e., six lenses, having a relative aperture of F/2.8 and a field angle of $2\omega=64°$.

The second embodiment is a lens system consisting of seven groups, i.e., seven lenses, having a relative aperture of F/2.8 and a field angle of $2\omega=76°$. The third and fourth embodiments are a lens system consisting of 8 groups, i.e., nine lenses and a lens system consisting of nine groups, i.e., 10 lenses respectively, both having a relative aperture of F/2.0 and a field angle of $2\omega=76°$.

The particulars of the first to fourth embodiments will be described hereinafter:

Embodiment 1
f = 1, 1:2.8, field angle $2\omega = 64°$ back focus s' = 1.06

| Radius of curvature | Distance along axis | Refractive index | Abbe's Number |
|---|---|---|---|
| rA1 = 2.6542 | | | |
| | dA1 = 0.057 | $N_{A1}$ = 1.5725 | $V_{A1}$ = 57.5 |
| rA2 = 0.5212 | | | |
| | dBO = 0.3292 | | |
| rB1 = 0.6639 | | | |
| | dB1 = 0.2149 | $N_{B1}$ = 1.6968 | $V_{B1}$ = 55.6 |
| rB2 = 2.3966 | | | |
| | dCO = 0.1699 | | |
| rC1 = 0.9176 | | | |
| | Dc1 = 0.07 | $N_{c1}$ = 1.6583 | $V_{c1}$ = 58.5 |
| rC2 = 0.8435 | | | |
| | dC2 = 0.1326 | | |
| rC3 = 0.4272 | | | |
| | dC3 = 0.0439 | $N_{c2}$ = 1.7006 | $V_{c2}$ = 30.1 |
| rC4 = 2.5205 | | | |
| | dC4 = 0.045 | | |
| rC5 = 1.8428 | | | |
| | dC5 = 0.067 | $N_{c3}$ = 1.7305 | $V_{c3}$ = 54.4 |
| rC6 = 0.5054 | | | |
| | dC6 = 0.0029 | | |
| rC7 = 5.8432 | | | |
| | dC7 = 0.068 | $N_{c4}$ = 1.6775 | $V_{c4}$ = 55.5 |
| rC8 = 1.0495 | | | |
| | $\Sigma 0\ d$ = 1.2004 | | |

Embodiment 2
f =1:2/8, field angle $2\omega = 0\ 76°$ back focus s' = 1.31

| Radius of curvature | Distance along axis | Refractive index | Abbe's Number |
|---|---|---|---|
| rA1 = 0.9483 | | | |
| | dA1 = 0.08 | $N_{A1}$ = 1.6214 | $V_{A1}$ = 61.3 |
| rA2 = 0.5452 | | | |
| | dA2 = 0.17 | | |
| rA3 = 1.2630 | | | |
| | dA3 = 0.065 | $N_{A2}$ = 1.6204 | $V_{A2}$ = 60.3 |
| rA4 = 0.5736 | | | |
| | dBO = 0.4145 | | |
| rB1 = 0.9542 | | | |
| | dB1 = 0.31 | $N_{B1}$ = 1.7170 | $V_{B1}$ = 47.9 |
| rB2 = −1.8101 | | | |
| | dCO = 0.1401 | | |
| rC1 = −5.2127 | | | |
| | dC1 = 0.0767 | $N_{c1}$ = 1.7440 | $V_{c1}$ = 44.9 |
| rC2 = −1.1791 | | | |
| | dC2 = 0.0984 | | |
| rC3 = −0.6112 | | | |
| | dC3 = 0.1467 | $N_{c2}$ = 1.7552 | $V_{c2}$ = 27.6 |
| rC4 = 1.7625 | | | |
| | dC4 = 0.0304 | | |
| rC5 = −2.1584 | | | |
| | dC5 = 0.085 | $N_{c3}$ = 1.7200 | $V_{c3}$ = 50.3 |
| rC6 = −0.5814 | | | |
| | dC6 = 0.0032 | | |
| rC7 = 9.2635 | | | |
| | dC7 = 0.07 | $N_{c4}$ = 1.6214 | $V_{c4}$ = 61.3 |
| rC8 = −1.8200 | | | |
| | $\Sigma\ d - 1.69$ | | |

Embodiment 3
f = 1   1:2.0,   field angle 2ω = 76°   back focus s' = 1.32

| Radius of Curvature | Distance along axis | Refractive index | Abbe's Number |
|---|---|---|---|
| $rA_1 = 2.6524$ | | | |
| | $dA_1 = 0.1030$ | $NA_1 = 1.6031$ | $VA_1 = 60.7$ |
| $rA_2 = 0.7652$ | | | |
| | $dA_2 = 0.3086$ | | |
| $rA_3 = 1.6973$ | | | |
| | $dA_3 = 0.1441$ | $NA_2 = 1.6668$ | $VA_2 = 33.1$ |
| $rA_4 = -147.9947$ | | | |
| | $dA_4 = 0.04$ | | |
| $rA_5 = 1.3048$ | | | |
| | $dA_5 = 0.0959$ | $NA_3 = 1.6890$ | $VA_3 = 49.3$ |
| $rA_6 = 0.5398$ | | | |
| | $dB_0 = 0.3153$ | | |
| $rB_1 = 1.2986$ | | | |
| | $dB_1 = 0.2701$ | $NB_1 = 1.7050$ | $VB_1 = 54.8$ |
| $rB_2 = -0.6026$ | | | |
| | $dB_2 = 0.1419$ | $NB_2 = 1.5190$ | $VB_2 = 57.3$ |
| $rB_3 = -2.3600$ | | | |
| | $dC_0 = 0.1640$ | | |
| $rC_1 = -1.2368$ | | | |
| | $dC_1 = 0.1100$ | $NC_1 = 1.5934$ | $VC_1 = 34.1$ |
| $rC_2 = -0.8499$ | | | |
| | $dC_2 = 0.0862$ | | |
| $rC_3 = -0.7622$ | | | |
| | $dC_3 = 0.1062$ | $NC_2 = 1.7847$ | $VC_2 = 25.7$ |
| $rC_4 = 2.4184$ | | | |
| | $dC_4 = 0.0855$ | | |
| $rC_5 = -1.8575$ | | | |
| | $dC_5 = 0.1007$ | $NC_3 = 1.7530$ | $VC_3 = 52.4$ |
| $rC_6 = -0.7447$ | | | |
| | $dC_{ars} = 0.0067$ | | |
| $rC_7 = 5.1620$ | | | |
| | $dC_7 = 0.1950$ | $NC_4 = 1.7050$ | $VC_4 = 54.8$ |
| $C_8 = -1.4574$ | | | |
| | $\Sigma d = 2.2729$ | | |

Embodiment 4
f = 1,   1:2,   field angle 2ω = 76°,   back focus s' = 1.31

| Radius of curvature | Distance along axis | Refractive index | Abbe's Number |
|---|---|---|---|
| $rA_1 = 8.9525$ | | | |
| | $dA_1 = 0.135$ | $NA_1 = 1.6935$ | $VA_1 = 53.4$ |
| $rA_2 = -26.3137$ | | | |
| | $dA_2 = 0.004$ | | |
| $rA_3 = 1.6630$ | | | |
| | $dA_3 = 0.06$ | $NA_2 = 1.5168$ | $VA_2 = 64.0$ |
| $rA_4 = 0.6306$ | | | |
| | $dA_4 = 0.1152$ | | |
| $rA_5 = 1.4500$ | | | |
| | $dA_5 = 0.06$ | $NA_3 = 1.5168$ | $VA_3 = 64.0$ |
| $rA_6 = 0.5848$ | | | |
| | $dB_0 = 0.2622$ | | |
| $rB_1 = 1.8044$ | | | |
| | $dB_1 = 0.06$ | $NB_1 = 1.5168$ | $VB_1 = 64.0$ |
| $rB_2 = 1.9818$ | | | |
| | $dB_2 = 0.0704$ | | |
| $rB_3 = 0.9816$ | | | |
| | $dB_3 = 0.2676$ | $NB_2 = 1.6975$ | $VB_2 = 48.2$ |
| $rB_4 = -1.2300$ | | | |
| | $dB_4 = 0.094$ | $NB_3 = 1.5231$ | $VB_3 = 58.6$ |
| $rB_5 = -5.0777$ | | | |
| | $dC_0 = 0.195$ | | |
| $rC_1 = -1.9893$ | | | |
| | $dC_1 = 0.1097$ | $NC_1 = 1.6200$ | $VC_1 = 36.3$ |
| $rC_2 = -0.8138$ | | | |
| | $dC_2 = 0.086$ | | |
| $rC_3 = -0.6430$ | | | |
| | $dC_3 = 0.1064$ | $NC_2 = 1.8052$ | $VC_2 = 25.4$ |
| $rC_4 = 2.6269$ | | | |
| | $dC_4 = 0.05$ | | |
| $rC_5 = -2.6680$ | | | |
| | $dC_5 = 0.1$ | $NC_3 = 1.7570$ | $VC_3 = 47.9$ |
| $rC_6 = -0.7408$ | | | |
| | $dC_6 = 0.0067$ | | |
| $rC_7 = 3.8156$ | | | |
| | $dC_7 = 0.18$ | $NC_4 = 1.7050$ | $VC_4 = 54.8$ |
| $rC_8 = -1.3884$ | | | |
| | $\Sigma d\ 1.9629$ | | |

Tables 1, 2, 3 and 4 show Seidel's co-efficient of aberrations of the first to fourth embodiments. These are also shown in FIGS. 5 to 8.

In the aforesaid respective embodiment, $rA_i$ ($i = 1$ to 6) represents the radius of curvature of the $i$ th curved surface of the first component from the front or object side, $rB_j$ ($j = 1$ to 5) represents the radius of curvature of the $j$ th curved surface of the second component from the front or object side, and $rC_k$ ($k = 1$ to 8) represents the radius of curvature of the $k$ th curved surface of the third component from the front object side. On the other hand, $dA_{i'}$ ($i' = 1$ to 5) represents the thickness of a lens and the axial distance between lenses of the first component A, $dB_{j'}$ ($j' = 0$ to 4) represents the thickness of a lens and the axial distance between lenses of the second component B, and $dC_{k'}$ ($k' = 0$ to 7) represents the axial distance between lenses and the thickness thereof of the third component C. Meanwhile, FIGS. 9 to 12 show the lateral aberration of the respective embodiment.

For information, the Seidel's co-efficient of aberrations of the aforesaid four embodiments are shown in Tables 1, 2, 3 and 4 below.

Table 1

(Embodiment 1)

| Surface | Spherical Aberration | Coma | Astigmatism | Pepzval Sum | Distortion |
|---|---|---|---|---|---|
| $A_1$ | 0.0124 | 0.0262 | 0.0556 | 0.1372 | 0.4085 |
| $A_2$ | −7.3600 | 0.9980 | −0.1353 | −0.6985 | 0.1131 |
| $B_1$ | 10.4218 | 0.4130 | 0.0164 | 0.6185 | 0.0252 |
| $B_2$ | 1.4344 | −1.1083 | 0.8563 | 0.1714 | −0.7940 |
| $C_1$ | −3.4903 | 1.7161 | −0.8438 | −0.4326 | 0.6276 |
| $C_2$ | 4.4284 | −1.8624 | 0.7833 | 0.4706 | −0.5273 |
| $C_3$ | −10.6632 | 2.0990 | −0.4131 | −0.9643 | 0.2711 |
| $C_4$ | −1.2716 | −1.1737 | −1.0833 | −0.1634 | −1.1508 |
| $C_5$ | 0.0828 | 0.2189 | 0.5786 | −0.2291 | 0.9239 |
| $C_6$ | 3.7158 | −0.5923 | 0.0944 | 0.8352 | −0.1482 |
| $C_7$ | −0.0000 | 0.0006 | −0.0732 | 0.0691 | 0.5226 |
| $C_8$ | 3.8059 | −0.7161 | 0.1347 | 0.3848 | −0.0978 |
| $\Sigma$ | 1.1163 | 0.0189 | −0.0296 | 0.1989 | 0.1738 |

Table 2

(Embodiment 2)

| Surface | Spherical Aberration | Coma | Astigmatism | Pepzval Sum | Distortion |
|---|---|---|---|---|---|
| $A_1$ | 0.2772 | 0.0755 | 0.0206 | 0.4041 | 0.1157 |
| $A_2$ | −3.3309 | 0.5329 | −0.0853 | −0.7029 | 0.1261 |
| $A_3$ | 0.8003 | 0.2364 | 0.0698 | 0.3031 | 0.1102 |
| $A_4$ | −9.3529 | 0.8024 | −0.0688 | −0.6675 | 0.0632 |
| $B_1$ | 10.9071 | 1.1726 | 0.1261 | 0.4376 | 0.0606 |
| $B_2$ | 1.9032 | −1.0229 | 0.5498 | 0.2307 | −0.4195 |
| $C_1$ | −0.5497 | 0.4413 | −0.3543 | −0.0818 | 0.3502 |
| $C_2$ | 9.4730 | −2.6026 | 0.7150 | 0.3618 | −0.2959 |
| $C_3$ | −18.6801 | 3.0119 | −0.4856 | −0.7039 | 0.1918 |
| $C_4$ | −1.9008 | −1.2835 | −0.8667 | −0.2441 | −0.7501 |
| $C_5$ | 0.0142 | 0.0657 | 0.3045 | −0.1939 | 0.5123 |
| $C_6$ | 8.8349 | −0.7636 | 0.0660 | 0.7200 | −0.0679 |
| $C_7$ | −0.0342 | 0.0740 | −0.1603 | 0.0414 | 0.2576 |
| $C_8$ | 3.0687 | −0.7127 | 0.1655 | 0.2106 | −0.0874 |
| $\Sigma$ | 1.4300 | 0.0274 | −0.0038 | 0.1150 | 0.1668 |

Table 3

(Embodiment 3)

| Surface | Spherical Aberration | Coma | Astigmatism | Pepzval Sum | Distortion |
|---|---|---|---|---|---|
| $A_1$ | 0.0126 | 0.0218 | 0.0379 | 0.1418 | 0.3121 |
| $A_2$ | −2.1203 | 0.6325 | −0.1887 | −0.4916 | 0.2029 |
| $A_3$ | 0.8991 | 0.1120 | 0.0140 | 0.2357 | 0.0311 |
| $A_4$ | −0.0004 | −0.0044 | −0.0434 | 0.0027 | −0.4038 |
| $A_5$ | 0.3826 | 0.1239 | 0.0401 | 0.3386 | 0.1226 |
| $A_6$ | −10.7381 | 1.5679 | −0.2289 | −0.7557 | 0.1438 |
| $B_1$ | 4.4900 | 0.5288 | 0.0623 | 0.3184 | 0.0448 |
| $B_2$ | 3.9824 | −1.3745 | 0.4744 | 0.1192 | −0.2049 |
| $B_3$ | 1.0484 | −0.7359 | 0.5166 | 0.1448 | −0.4642 |
| $C_1$ | −2.3071 | 1.1285 | −0.5520 | −0.3011 | 0.4173 |
| $C_2$ | 6.9709 | −2.1301 | 0.6509 | 0.4382 | −0.3328 |
| $C_3$ | −7.7568 | 2.0291 | −0.5308 | −0.5769 | 0.2898 |
| $C_4$ | −1.1461 | −0.8854 | −0.6840 | −0.1818 | −0.6688 |
| $C_5$ | 0.0003 | 0.0085 | 0.2480 | −0.2313 | 0.4891 |
| $C_6$ | 2.8015 | −0.5032 | 0.0904 | 0.5768 | −0.1199 |
| $C_7$ | −0.0004 | −0.0016 | −0.0062 | 0.0993 | 0.3714 |
| $C_8$ | 4.1821 | −0.5660 | 0.0766 | 0.2837 | −0.0488 |
| $\Sigma$ | 0.7006 | −0.0480 | −0.0228 | 0.1609 | 0.1817 |

Table 4

(Embodiment 4)

| Surface | Spherical Aberration | Coma | Astigmatism | Pepzval Sum | Distortion |
|---|---|---|---|---|---|
| $A_1$ | 0.0003 | 0.0028 | 0.0226 | 0.0457 | 0.5595 |
| $A_2$ | 0.0015 | −0.0119 | 0.0927 | 0.0156 | −0.8443 |
| $A_3$ | 0.0183 | 0.0249 | 0.0338 | 0.2049 | 0.3241 |
| $A_4$ | −2.0832 | 0.2333 | −0.0261 | −0.5403 | 0.0634 |
| $A_5$ | 0.4614 | 0.1710 | 0.0634 | 0.2350 | 0.1105 |
| $A_6$ | −7.4566 | 0.9993 | −0.1339 | −0.6032 | 0.0988 |
| $B_1$ | 2.4826 | 0.4600 | 0.0851 | 0.1888 | 0.0507 |
| $B_2$ | −2.2106 | −0.4933 | −0.1101 | −0.1719 | −0.0629 |
| $B_3$ | 6.9611 | 0.6517 | 0.0610 | 0.4186 | 0.0449 |
| $B_4$ | 0.4263 | −0.2227 | 0.1163 | 0.0549 | −0.0894 |
| $B_5$ | 0.1438 | −0.1842 | 0.2361 | 0.0676 | −0.3892 |
| $C_1$ | −0.4874 | 0.3752 | −0.2889 | −0.1924 | 0.3705 |
| $C_2$ | 7.6340 | −1.9869 | 0.5171 | 0.4703 | −0.2570 |
| $C_3$ | −10.3814 | 1.9754 | −0.3759 | −0.6937 | 0.2035 |
| $C_4$ | −1.8167 | −1.3323 | −0.9770 | −0.1698 | −0.8410 |
| $C_5$ | 0.1333 | 0.2557 | 0.4902 | −0.1615 | 0.6304 |
| $C_6$ | 2.4585 | −0.4306 | 0.0754 | 0.5816 | −0.1151 |
| $C_7$ | 0.0028 | 0.0085 | 0.0254 | 0.1084 | 0.4012 |
| $C_8$ | 4.3855 | −0.4997 | 0.0570 | 0.2978 | −0.0404 |
| $\Sigma$ | 0.6736 | −0.0044 | −0.0359 | 0.1563 | 0.2182 |

As is apparent from the aberration compensation shown in the aforesaid figures, the present invention presents a lens system having a wide field angle, a long back focus, a relative aperture presenting a high brightness and various aberrations well compensated.

Furthermore, according to the present invention, since the diameter of the lens on the object side may be maintained relatively smaller, the lens system may be used as a wide angle lens for a single reflex camera having the same threaded diameter for filters as that of the filters for the standard lens.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

We claim:

1. A retro-focus wide angle lens system comprising:
   a first component which is located on the object side, has a negative refractive power and consists consecutively from the front to the rear of a positive lens, a negative meniscus lens having a rear concave surface and a negative meniscus lens having a rear concave surface;
   a second component rearward of said first component and consisting from the front to the rear of a positive meniscus lens having a rear concave surface and a biconvex lens formed by a cemented doublet;
   a third component rearward of said second component and consisting consecutively from the front to the rear of a positive meniscus first lens having a rear convex surface, a biconcave second lens spaced from said positive meniscus first lens, a positive meniscus third lens having a convex rear surface and a positive fourth lens, said first and second lenses over-all having a negative refractive power; and
   a diaphragm disposed between said second and third components.

2. A retro-focus type wide angle lens system comprising
   a first component which is located on the object side, has a negative refractive power, includes a negative lens group having at least one negative meniscus lens;
   a second component rearward of said first component and including a lens group which has a positive refractive power and includes at least one biconvex lens;
   a third component rearward of said second component and consisting consecutively from the front to the rear of a positive meniscus first lens having a rear convex surface, a biconcave second lens, a positive meniscus third lens having a convex rear surface and a positive fourth lens, and satisfying the following conditions:

(1) $d_{c0} > d_{c2}$ (2) $|r_{c2}| \geq |r_{c3}|$ (3) $V_{c1} > V_{c2}$ (4) $d_{c0} > d_{c4}$ wherein
   $r_{c2}$ and $r_{c3}$ are the radius of curvature of the rear surface of the first lens of the third component and the radius of curvature of the front surface of the second lens of the third component, respectively;
   $d_{c0}$ is the axial distance between the lens of the second component on the side nearest to the image and the first lens of the third component;
   $d_{c2}$ and $d_{c4}$ are the axial distance between the first and second lenses of the third component and the axial distance between the second lens and the third lens; and
   $V_{c1}$ and $V_{c2}$ are Abbe's Numbers of the first and second lenses of the third component, said lens system consisting of the following six lenses having a relative aperture of F/2.8, a back focus of 1.06 times the focal length and a field angle of $2\omega = 64°$:

| Radius of curvature | Distance along axis | Refractive index | Abbe's Number |
|---|---|---|---|
| $rA_1 = 2.6542$ | | | |
| | $dA_1 = 0.057$ | $NA_1 = 1.5725$ | $V_{A1} = 57.5$ |
| $rA_2 = 0.5212$ | | | |
| | $dB_0 = 0.3292$ | | |
| $rB_1 = 0.6639$ | | | |
| | $dB_1 = 0.2149$ | $N_{B1} = 1.6968$ | $V_{B1} = 55.6$ |
| $rB_2 = -2.3966$ | | | |
| | $dC_0 = 0.1699$ | | |
| $rC_1 = -0.9176$ | | | |
| | $dC_1 = 0.07$ | $N_{C1} = 1.6583$ | $V_{C1} = 58.5$ |
| $rC_2 = -0.8435$ | | | |
| | $dC_2 = 0.1326$ | | |
| $rC_3 = -0.4272$ | | | |
| | $dC_3 = 0.0439$ | $N_{C2} = 1.7006$ | $V_{C2} = 30.1$ |
| $rC_4 = 2.5205$ | | | |
| | $dC_4 = 0.045$ | | |
| $rC_5 = -1.8428$ | | | |
| | $dC_5 = 0.067$ | $N_{C3} = 1.7305$ | $V_{C3} = 54.4$ |
| $rC_6 = -0.5054$ | | | |
| | $dC_6 = 0.0029$ | | |
| $rC_7 = 5.8432$ | | | |
| | $dC_7 = 0.068$ | $N_{C4} = 1.6775$ | $V_{C4} = 55.5$ |
| $rC_8 = -1.0495$ | | | |
| $\Sigma d = 1.2004$ . | | | |

3. A retro-focus type lens system consisting of the following six lenses, having a relative aperture of F/2.8, a back focus of 1.06 times the focal length and a field angle of $2\omega = 64°$:

| Radius of curvature | Distance along axis | Refractive index | Abbe's Number |
|---|---|---|---|
| $rA_1 = 2.6542$ | | | |
| | $dA_1 = 0.057$ | $NA_1 = 1.5725$ | $V_{A1} = 57.5$ |
| $rA_2 = 0.5212$ | | | |
| | $dB_0 = 0.3292$ | | |
| $rB_1 = 0.6639$ | | | |
| | $dB_1 = 0.2149$ | $N_{B1} = 1.6968$ | $V_{B1} = 55.6$ |
| $rB_2 = -2.3966$ | | | |
| | $dC_0 = 0.1699$ | | |
| $rC_1 = -0.9176$ | | | |
| | $dC_1 = 0.07$ | $N_{C1} = 1.6583$ | $V_{C1} = 58.5$ |
| $rC_2 = -0.8435$ | | | |
| | $dC_2 = 0.1326$ | | |
| $rC_3 = -0.4272$ | | | |
| | $dC_3 = 0.0439$ | $N_{C2} = 1.7006$ | $V_{C2} = 30.1$ |
| $rC_4 = 2.5205$ | | | |
| | $dC_4 = 0.045$ | | |
| $rC_5 = -1.8428$ | | | |
| | $dC_5 = 0.067$ | $N_{C3} = 1.7305$ | $V_{C3} = 54.4$ |
| $rC_6 = -0.5054$ | | | |
| | $dC_6 = 0.0029$ | | |
| $rC_7 = 5.8432$ | | | |
| | $dC_7 = 0.068$ | $N_{C4} = 1.6775$ | $V_{C4} = 55.5$ |
| $rC_8 = -1.0495$ | | | |
| $\Sigma d = 1.2004$ . | | | |

4. A retro-focus type lens system consisting of the following seven lenses, having a relative aperture of F/2.8, a back focus of 1.31 times the focal length and field angle of $2\omega = 76°$:

| Radius of curvature | Distance along axis | Refractive index | Abbe's Number |
|---|---|---|---|
| $rA1 = 0.9483$ | | | |
| | $dA1 = 0.08$ | $N_{A1} = 1.6214$ | $V_{A1} = 61.3$ |
| $rA2 = 0.5452$ | | | |
| | $dA2 = 0.17$ | | |
| $rA3 = 1.2630$ | | | |
| | $dA3 = 0.065$ | $N_{A2} = 1.6204$ | $V_{A2} = 60.3$ |
| $rA4 = 0.5736$ | | | |
| | $dB0 = 0.4145$ | | |
| $rB1 = 0.9542$ | | | |
| | $dB1 = 0.31$ | $N_{B1} = 1.7170$ | $V_{B1} = 47.9$ |
| $rB2 = -1.8101$ | | | |
| | $dC0 = 0.1401$ | | |

-continued

| Radius of curvature | Distance along axis | Refractive index | Abbe's Number |
|---|---|---|---|
| rC1 = −5.2127 | | | |
| | dC1 = 0.0767 | $N_{C1}$ = 1.7440 | $V_{C1}$ = 44.9 |
| rC2 = −1.1791 | | | |
| | dC2 = 0.0984 | | |
| rC3 = −0.6112 | | | |
| | dC3 = 0.1467 | $N_{C2}$ = 1.7552 | $V_{C2}$ = 27.6 |
| rC4 = 1.7625 | | | |
| | dC4 = 0.0304 | | |
| rC5 = −2.1584 | | | |
| | dC5 = 0.085 | $N_{C3}$ = 1.7200 | $V_{C3}$ = 50.3 |
| rC6 = −0.5814 | | | |
| | dC6 = 0.0032 | | |
| rC7 = 9.2635 | | | |
| | dC7 = 0.07 | $N_{C4}$ = 1.6214 | $V_{C4}$ = 61.3 |
| rC8 = −1.8200 | | | |
| | Σd = 1.69. | | |

5. A retro-focus lens system consisting of the following nine lenses, having a relative aperture of F/2.0, a back focus of 1.31 times the focal length and a field angle of 2ω = 76°.

| Radius of curvature | Distance along axis | Refractive index | Abbe's Number |
|---|---|---|---|
| rA1 = 2.6524 | | | |
| | dA1 = 0.1030 | $NA_1$ = 1.6031 | $VA_1$ = 60.7 |
| rA2 = 0.7652 | | | |
| | dA2 = 0.3086 | | |
| rA3 = 1.6973 | | | |
| | dA3 = 0.1441 | $NA_2$ = 1.6668 | $VA_2$ = 33.1 |
| rA4 = −147.9947 | | | |
| | dA4 = 0.04 | | |
| rA5 = 1.3048 | | | |
| | dA5 = 0.0959 | $NA_3$ = 1.6890 | $VA_3$ 49.3 |
| rA6 = 0.5398 | | | |
| | dB0 = 0.3153 | | |
| rB1 = 1.2986 | | | |
| | dB1 = 0.2701 | $NB_1$ = 1.7050 | $VB_1$ = 54.8 |
| rB2 = −0.6026 | | | |
| | dB2 = 0.1419 | $NB_2$ = 1.5190 | $VB_2$ = 57.3 |
| rB3 = −2.3600 | | | |
| | dC0 = 0.1640 | | |
| rC1 = −1.2368 | | | |
| | dC1 = 0.1100 | $NC_1$ = 1.5934 | $VC_1$ = 34.1 |
| rC2 = −0.8499 | | | |
| | dC2 = 0.0862 | | |
| rC3 = −0.7622 | | | |
| | dC3 = 0.1062 | $NC_2$ = 1.7847 | $VC_2$ = 25.7 |
| rC4 = 2.4184 | | | |
| | dC4 = 0.0855 | | |
| rC5 = −1.8575 | | | |
| | dC5 = 0.1007 | $NC_3$ = 1.7530 | $VC_3$ = 52.4 |

-continued

| Radius of curvature | Distance along axis | Refractive index | Abbe's Number |
|---|---|---|---|
| rC6 = −0.7447 | | | |
| | dC6 = 0.0067 | | |
| rC7 = 4.1620 | | | |
| | dC7 = 0.1950 | $NC_4$ = 1.7050 | $VC_4$ = 54.8 |
| rC8 = 1.4574 | | | |
| | Σd = 2.2729. | | |

6. A retro-focus type lens system consisting of the following 10 lenses, having a relative aperture of F/2.0, a back focus of 1.31 times the focal length and a field angle of 2ω = 76°:

| Radius of curvature | Distance along axis | Refractive index | Abbe's Number |
|---|---|---|---|
| rA1 = 8.9525 | | | |
| | dA1 = 0.135 | $NA_1$ = 1.6935 | VA = 53.4 |
| rA2 = −26.3137 | | | |
| | dA2 = 0.004 | | |
| rA 3 = 1.6630 | | | |
| | dA3 = 0.06 | $NA_2$ = 1.5168 | $VA_2$ = 64.0 |
| rA4 = 0.6306 | | | |
| | dA4 = 0.1152 | | |
| rA5 = 1.4500 | | | |
| | dA5 = 0.06 | $NA_3$ = 1.5168 | $VA_3$ = 64.0 |
| rA6 = 0.5848 | | | |
| | dB0 = 0.2622 | | |
| rB1 = 1.8044 | | | |
| | dB1 = 0.06 | $NB_1$ = 1.5168 | $VB_1$ = 64.0 |
| rB2 = 1.9818 | | | |
| | dB2 = 0.0704 | | |
| rB3 = 0.9816 | | | |
| | dB3 = 0.2676 | $NB_2$ = 1.6975 | $VB_2$ = 48.2 |
| rB4 = −1.2300 | | | |
| | dB4 = 0.094 | $NB_3$ = 1.5231 | $VB_3$ = 58.6 |
| rB5 = −5.0777 | | | |
| | dC0 = 0.195 | | |
| rC1 = −1.9893 | | | |
| | dC1 = 0.1097 | $NC_1$ = 1.6200 | $VC_1$ = 36.3 |
| rC2 = −0.8138 | | | |
| | dC3 = 0.086 | | |
| rC3 = −0.6430 | | | |
| | dC3 = 0.1064 | $NC_2$ = 1.8052 | $VC_2$ = 25.4 |
| rC4 = 2.6269 | | | |
| | dC4 = 0.05 | | |
| rC5 = −2.6680 | | | |
| | dC5 = 0.1 | $NC_3$ = 1.7570 | $VC_3$ = 47.9 |
| rC6 = −0.7408 | | | |
| | dC6 = 0.0067 | | |
| rC7 = 3.8156 | | | |
| | dC7 = 0.18 | $NC_4$ = 1.7050 | $VC_4$ = 54.8 |
| rC8 = −1.3884 | | | |
| | Σd =1.9629. | | |

* * * * *